United States Patent [19]

Domergue et al.

[11] 3,852,275
[45] Dec. 3, 1974

[54] PYRAZOLINE OPTICAL BRIGHTENING AGENTS

[75] Inventors: Annick Marthe Suzanne Simone Domergue, Eaubonne; Georges Raymond Henry Mingasson, Paris; Robert Frédéric Michel Sureau, Enghien les Bains, all of France

[73] Assignee: Ugine Kuhlmann, Paris, France

[22] Filed: Nov. 24, 1971

[21] Appl. No.: 201,993

[52] U.S. Cl............................ 260/239.9, 252/301.2
[51] Int. Cl............................................. C07d 49/10
[58] Field of Search...................... 260/239.9, 310 D

[56] References Cited
UNITED STATES PATENTS

| | | | |
|---|---|---|---|
| 3,097,210 | 7/1963 | Bicking | 260/294.8 |
| 3,131,079 | 4/1964 | Wagner | 117/33.5 |
| 3,629,241 | 12/1971 | Krause | 260/239.9 |

FOREIGN PATENTS OR APPLICATIONS

| | | | |
|---|---|---|---|
| 1,111,986 | 5/1968 | Great Britain | 260/239.9 |
| 1,461,687 | 11/1966 | France | 260/239.9 |

*Primary Examiner*—Henry R. Jiles
*Assistant Examiner*—C. M. S. Jaisle
*Attorney, Agent, or Firm*—Browne, Beveridge, Degrandi & Kline

[57] ABSTRACT

The present invention provides compounds of the formula:

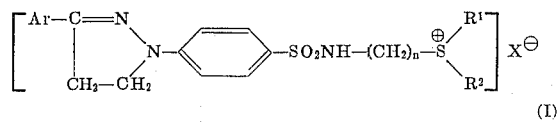

(I)

wherein Ar represents an aromatic residue which may be substituted by substituents not having a chromophoric or anionic character, $R^1$ and $R^2$ represent alkyl groups containing one to five carbon atoms, which may be the same or different, $n$ is 2 or 3 and X represents a monovalent anion or its equivalent. It also relates to the preparation of such compounds and to their use in optical brightening or whitening fibres based on polymers or copolymers of acrylonitrile.

5 Claims, No Drawings

PYRAZOLINE OPTICAL BRIGHTENING AGENTS

The present invention relates to new cationic optical brightening agents and to their use in brightening or whitening fibres based on polymers or copolymers of acrylonitrile.

In French Pat. No. 1,172,759, filed on Mar. 1957, there are described 1,3-diaryl or 1,3,5-triaryl pyrazolines containing a sulphonamido group which may be used as brightening agents, being particularly advantageous for brightening bulk polymers or copolymers of acrylonitrile intended to be spun. Such compounds are not generally soluble in an aqueous medium, which makes difficult their application to fibres based on polymers or copolymers of acrylonitrile in an open bath. They have to be very finely dispersed. They brighten the fibres by penetrating therein owing to their plastosolubility; there is no chemical reaction and their fastness is found to be reduced. In addition, the brightening is generally accompanied by an undesirable greenish effect, especially when the sulphonamide group of the pyrazoline carries a basic nitrogen group as a substituent.

It has now been found that it is possible to dye fibres based on polymers or copolymers of acrylonitrile so as to obtain an optical brightening effect which is fast to washing, by means of the compounds of the present invention.

According to the present invention there is provided a compound of the formula:

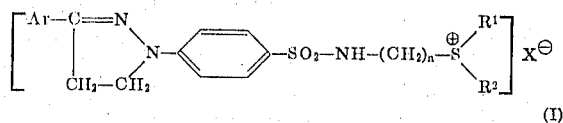

(I)

wherein Ar represents an aromatic residue which may be substituted by substituents which have no chromophoric or anionic character, $R^1$ and $R^2$ represent alkyl groups containing one to five carbon atoms, preferably methyl or ethyl which may be the same or different, $n$ is 2 or 3 and X represents a monovalent anion or its equivalent.

The compounds of formula (I) may be obtained by reacting a Δ2-pyrazoline of the formula:

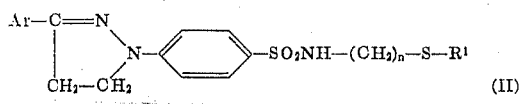

(II)

wherein Ar, $n$ and $R^1$ are as defined above, with an alkylating agent of formula $X—R^2$, wherein $R^2$ is as defined above. Alkylating agents of formula $X—R^2$, may be for example an alkyl halide, sulphate or sulphonate. The alkylation treatment may if desired be carried out in the presence of solvents such as aromatic hydrocarbons, their chlorinated derivatives, dimenthylformamide, or chloroform. A dialkyl sulphate, for example dimethyl sulphate, is preferably used at temperatures between 30°C. and 130°C. especially between 60°C. and 80°C.

The compounds of formula (II) may be obtained, for example, by reacting a sulphnoic acid halide of the formula:

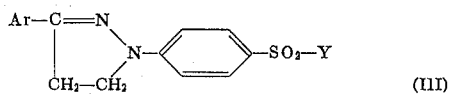

(III)

wherein Ar is as defined hereinabove and Y represents a halogen atom, preferably a chlorine atom, with an amine of the formula:

in which $R^1$ represents an alkyl group containing one to five carbon atoms and $n$ is 2 or 3, in aqueous or organic medium and in the presence of an alkaline agent, at temperatures between 80°C. and 130°C. The alkaline agent may be the amine itself, an alkali metal carbonate or hydroxide or a tertiary nitrogen base.

The halides of the Δ2-pyrazoline-sulphonic acids of formula (III) may be obtained by known processes, for example by reacting the corresponding pyrazoline-sulphonic acids with a halide of a mineral acid, such as thionyl chloride, in an inert solvent and possibly in the presence of a catalyst such as dimethyl formamide.

The new compounds of the present invention are obtained in the form of colourless or light yellow powders, which are very soluble in water. The aqueous solutions of these products have a strong blue or greenish-blue fluorescence, which is quite visible to the naked eye. They have the advantage of being utilisable for brightening or whitening fibres based on polymers or copolymers of acrylonitrile either by dyeing in a slightly acid bath, or by foularding followed by heat-fixing. The compounds according to the present invention form a chemical combination with the fibres. The blueing effect obtained is a brilliant white, which is resistant to repeated washing and fast to light. The anion X does not take part in the brightening or whitening; only the cation takes part in the combination. If desired, the compounds of formula (I) may be incorporated in the bulk materials for spinning.

In the following examples, to which the invention is not restricted, the parts are parts by weight unless the contrary is indicated.

EXAMPLE 1

35.5 parts of 1-(4-chlorosulphonyl-phenyl)-3-(4-chlorophenyl)-Δ2-pyrazoline are introduced in a period of half an hour into a solution consisting of 18.2 parts of β-methylthioethylamine and 500 parts of water at 95°C. The reaction mixture is heated under reflux for 3 hours. The precipitate obtained is filtered off after cooling, washed with water and dried. 33 parts of 1-[N-(2-methylthio-ethyl)-4-aminosulphonyl-phenyl]-3-(4-chloro-phenyl)-Δ2-pyrazoline are obtained in the form of a light yellow powder melting at 169°C. after crystallisation from ethanol.

Analysis gives the following results for $C_{18}H_{20}Cl N_3O_2S$

| | | | |
|---|---|---|---|
| Calculated: | C% 52.74 | N% 10.25 | Cl% 8.66 |
| Found: | 52.7 | 10.6 | 8.55 |

EXAMPLE 2

On operating according to the process described in Example 1, but replacing the 18.2 parts of methylthio-ethylamine by 21 parts of 3-methylthio-propylamine, 37 parts of 1—[N-(3-methylthio-propyl)-4- aminosulphonyl-phenyl]-3-(4-chloro-phenyl)-Δ2-pyrazoline of melting point 158°C. are obtained.

EXAMPLE 3

28.6 parts of the thio-derivative prepared as in Example 1 are introduced gradually into 64 parts of methyl sulphate heated to 80°C. The mixture is heated at this temperature for a further hour, and the thick mixture obtained is cooled and diluted with chloroform. The S,S-dimethyl-S-[4'-(4'-chloro-3-phenyl-Δ2-pyrazolinyl)-2-phenylsulphonylamino-ethyl]sulfonium methyl sulphate is filtered off.

This compound dissolves in water with a strong blue fluorescence.

A treatment bath is prepared with 300 parts of water, 3 parts of acetic acid and 0.4 parts of the sulphonium salt. It is heated to 40°C. and 100 parts of a "Courtelle" fabric are introduced ("Courtelle" is a Trade Mark). The bath is heated to boiling and maintained at this temperature for an hour. The fabric is removed, rinsed and dried. It has acquired a remarkable whiteness without any excessive dominating colour.

EXAMPLE 4

21.2 parts of the thio-derivative prepared as in Example 2 are introduced into 13 parts of methyl sulphate, previously heated to 80°C. The reaction mixture is maintained at this temperature for an hour, then cooled, and the solution obtained is diluted with water. Animal charcoal is added while the solution is hot and the solution is filtered. 100 parts of this solution contain 20 parts of S,S-dimethyl-S-[4'-(4'-chloro-3-phenyl-Δ2-pyrazolinyl)-3-phenyl-sulphonylamino-propyl] sulphonium methyl sulphate. This compound imparts a remarkable whiteness to polyacrylic fibres by dyeing.

EXAMPLE 5

4.1 parts of the thio-derivative prepared according to Example 1 are dissolved in 6 parts of ethyl sulphate heated to 80°C. This temperature is maintained for half an hour, then the solution is allowed to cool, and ether is added and then alcohol while stirring. 4 parts of S-methyl-S-ethyl-S-[4'-(4'-chloro-3-phenyl-Δ2-pyrazolinyl)-2-phenylsulphonylamino-ethyl] sulphonium ethyl sulphate are obtained as a crystalline product, which gives a very pronounced blueing effect on the polyacrylic fibres.

We claim:

1. A compound of the formula:

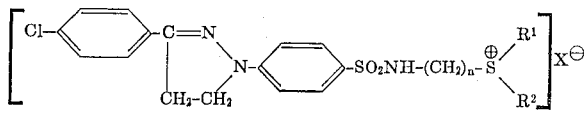

wherein $R^1$ and $R^2$ represent alkyl groups containing one to five carbon atoms, which may be the same or different, $n$ is 2 or 3 and X represents an anion selected from the group consisting of halide sulfate, and sulfonate.

2. S,S-Dimethyl-S-[4'(4'-chloro-3-phenyl-Δ2-pyrazolinyl)-2-phenyl-sulphonylamino-ethyl] sulphonium methyl-sulphate.

3. S,S-Dimethyl-S-[4'-(4'-chloro-3-phenyl-Δ2-pyrazolinyl)-3-phenyl-sulphonylamino-propyl] sulphonium methyl-sulphate.

4. S-Methyl-S-ethyl-S-[4'-(4'-chloro-3-phenyl-Δ2-pyrazolinyl)-2-phenylsulphonylamino-ethyl] sulphonium ethyl-sulphate.

5. A Δ2-pyrazoline of the formula:

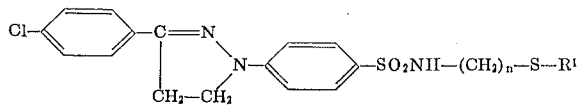

wherein $R^1$ represents an alkyl group containing one to five carbon atoms, and $n$ is 2 or 3.

* * * * *

UNITED STATES PATENT OFFICE
CERTIFICATE OF CORRECTION

Patent No. 3,852,275        Dated December 3, 1974

Inventor(s) ANNICK MARTHE SUZANNE SIMONE DOMERGUE ET AL

It is certified that error appears in the above-identified patent and that said Letters Patent are hereby corrected as shown below:

In the heading of the patent, insert

-- Claims priority, application in France of 7042484 --- November 26, 1970. --

Signed and sealed this 22nd day of April 1975.

(SEAL)
Attest:

RUTH C. MASON
Attesting Officer

C. MARSHALL DANN
Commissioner of Patents
and Trademarks